US007133901B1

(12) United States Patent
Dalby et al.

(10) Patent No.: US 7,133,901 B1
(45) Date of Patent: Nov. 7, 2006

(54) METHODS AND SYSTEMS FOR DELIVERING ANNOUNCEMENTS TO USERS OF AN INFORMATION SYSTEM

(75) Inventors: Richard Sean Dalby, Salt Lake City, UT (US); William A. Boyd, Salt Lake City, UT (US); Korb S. Matosich, Stanford, CA (US); Matthew O. Smith, West Bountiful, UT (US)

(73) Assignee: SunGard SCT Inc., Malvern, PA (US)

( * ) Notice: Subject to any disclaimer, the term of this patent is extended or adjusted under 35 U.S.C. 154(b) by 1033 days.

(21) Appl. No.: 10/008,342

(22) Filed: Nov. 13, 2001

Related U.S. Application Data (63) Continuation of application No. 09/896,840, filed on Jun. 29, 2001, now abandoned.

(60) Provisional application No. 60/214,937, filed on Jun. 29, 2000.

(51) Int. Cl.
 *G06F 15/16* (2006.01)
 *G06Q 30/00* (2006.01)
(52) U.S. Cl. .......................................... 709/206; 705/14
(58) Field of Classification Search ................... 705/14; 709/204–206
 See application file for complete search history.

(56) References Cited

U.S. PATENT DOCUMENTS

| 5,745,573 | A | 4/1998 | Lipner et al. ............... 380/21 |
| 5,764,767 | A | 6/1998 | Beimel et al. .............. 380/21 |
| 6,141,423 | A | 10/2000 | Fischer ..................... 380/286 |
| 6,183,366 | B1 * | 2/2001 | Goldberg et al. ........... 463/42 |
| 6,202,150 | B1 | 3/2001 | Young et al. .............. 713/167 |
| 6,460,036 | B1 * | 10/2002 | Herz ......................... 707/10 |
| 6,487,584 | B1 * | 11/2002 | Bunney ..................... 709/206 |
| 6,751,657 | B1 * | 6/2004 | Zothner ..................... 709/220 |
| 2005/0209914 | A1 * | 9/2005 | Nguyen et al. .............. 705/14 |

OTHER PUBLICATIONS

Novell Single Sign-On, pp. 1-6, Apr. 1999.
Adi Shamir, Massachusetts Institute of Technology, "How to Share A Secret," Communications of the ACM, Nov. 1979, vol. 22, No. 11, pp. 612-613.
Novell Single Sign-On, http://www.novell.com/documentation/lg/sso2/treetitl.html, pp.1-70, Oct. 10, 2001.
Tivoli Software, Tivoli® Secure Way® Global Sign-On, http://www.tivoli.com/products/index/gso, pp. 1-2, Oct. 10, 2001.
Tivoli Software, Tivoli® Security Products, http://www.tivoli.com/products/solutions/security/products.html, pp. 1, Oct. 10, 2001.
Tivoli Software, Tivoli® Secure Way® Policy Director, http://www.tivoli.com/products/index/secureway_policy_dir/index.html, pp. 1-2, Oct. 10, 2001.

(Continued)

*Primary Examiner*—Glenton B. Burgess
*Assistant Examiner*—Aaron Strange
(74) *Attorney, Agent, or Firm*—Madson & Austin (57) ABSTRACT

Methods and systems for enabling efficient electronic communication between individuals affiliated with an organization are provided. The present invention enables a user, such as an administrator, to prepare and deliver an electronic announcement to users without specifically identifying each user or creating a predefined group of users. These targeted electronic announcements are deliverable to such users based, in part, on descriptive attributes, such as academic attributes, that distinguish such users or users from other members of a community information system, such as a university. Additionally, embodiments of the present invention facilitate designating attributes that define the manner used to distribute the electronic announcement, such as to a user or recipient's personalized web page acting as an interface to the community information system. Other attributes include a designation as to the priority of the electronic announcement, an expiration period or date that defines when the message will automatically be deleted, and the like.

30 Claims, 6 Drawing Sheets

OTHER PUBLICATIONS

Tivoli Software, Tivoli® Secure Way® Policy Director for MQSeries®; http://www.tivoli.com/products/index/secureway_policy_dir_mgs/index.html, pp. 1-3, Oct. 10, 2001.

Tivoli Software, Tivoli® Secure Way® Privacy Manager, http://www.tivoli.com/products/index/secureway_privacy_mgr/index.html, pp. 1, October 10, 2001.

Tivoli Software, Tivoli® Secure Way® Global Sign-On, http://www.tivoli.com/products/index/gso/index.html, pp. 1-2, Oct. 10, 2001.

Tivoli Software, Tivoli® Risk Manager, http://www.tivoli.com/products/index/secureway_risk_mgr/index.html, pp. 1-3, October 10, 2001.

Tivoli Software, Tivoli® Intrusion Manager, http://www.tivoli.com/products/index/intrusion-mgr/index.html, pp. 1-2, Oct. 10, 2001.

Tivoli Software, Tivoli® Identity Director, http://www.tivoli.com/products/index/identity_dir/index.html, pp. 1-3, Oct. 10, 2001.

Tivoli Software, Tivoli® Secure Way® User Administration, http://www.tivoli.com/products/index/user_admin/index.html, pp. 1-2, Oct. 10, 2001.

Tivoli Software, Tivoli® Secure Way® Security Manager, http://www.tivoli.com/products/index/security_mgt/index.html, pp. 1-2, Oct. 10, 2001.

Tivoli Software, Tivoli® Secure Way® Related Information, http://www.tivoli.com/products/solutions/security/secureway_product_info.html, pp. 1, Oct. 10, 2001.

Tivoli Software, Tivoli® Business Partner Directory, http://www.tivoli.com/Tivoli_Channels/WebPartners.nsf//Tivoli+ Partner' OpenForm, pp. 1, Oct. 10, 2001.

Tivoli Software, Tivoli® Products License Information, Tivoli Value-Based Pricing Products, http://www.tivoli.com/products/licensing, pp. 1-4, Oct. 10, 2001.

Microsoft User's Guide to Outlook Express 5: Address Book, \help\wab.chm::/wab_search_for_names_in_dir.htm, pp. 1, Jan. 17, 2002.

Netscape User's Guide to Messenger 4.5: Address Book, /Nethelp/netscape/messemgr/mess.htm, pp. 1-6, Jan. 17, 2002.

\* cited by examiner

METHODS AND SYSTEMS FOR DELIVERING ANNOUNCEMENTS TO USERS OF AN INFORMATION SYSTEM

CROSS-REFERENCE TO RELATED APPLICATIONS

This is a continuation of U.S. patent application Ser. No. 09/896,840, filed Jun. 29, 2001, now abandoned which claims priority to U.S. Provisional Application Ser. No. 60/214,937, filed Jun. 29, 2000.

BACKGROUND OF THE INVENTION

1. The Field of the Invention

The present invention relates to facilitating communication between various users in networked or disparate systems. More specifically, the present invention relates to enabling a user to transmit textual or graphical information to one or more users based upon descriptive attributes associated with each user.

2. The Relevant Technology

Efficiently communicating information and knowledge has been a continual challenge and pursuit of individuals and business alike. As a result, advances in technology in recent years have led to improved communications systems and created new ways of transmitting information. One such communications system is the Internet. Through the Internet, physically isolated individuals and businesses can share information and communicate through various means, including web pages, email, chat rooms, and the like.

In addition to the Internet, many organizations and businesses develop an intranet or network to share information and knowledge between the members of the organization or business. Typically, such intranets are based upon TCP/IP protocols, as is the Internet, and are accessible only to authorized employees or individuals associated with the particular organization or business. These intranets can display information and knowledge as web pages and can use uniform resource locators (URLs) to identify the location of such web pages within the intranet.

One type of organization that can use an intranet to share information is a community information network, such as a university or similar institution. A university's intranet typically connects the various buildings and departments and facilitates communication between students, faculty, alumni, and university administration. Because of the size and diverse nature of a university, each student, faculty member, alumnus, administrator, department, employee, or other person affiliated with the university has a broad series of relations with other students, faculty members, etc. that are also associated with the university. Typically, each such individual or department communicates on a regular basis with other individuals or departments associated with the university.

Often, individuals affiliated with the university, such as faculty members and administrators, need to communicate identical information to various individuals in a particular group that shares certain characteristics. For example, a professor may wish to send a message to his or her students regarding a class cancellation or a housing administrator may wish to send a message to all dormitory residents informing them of an upcoming activity. Typical current methods of communicating such information consist of flyers, bulletins, central home pages, and group email messages where each email address is manually entered. However, such methods do not enable a user to quickly isolate the particular individuals they wish to receive the message.

Further, despite the typical extent of an individual's associations with a university, they are not in constant contact with the university or university systems. For example, students may live off campus and have Internet access that is unaffiliated with the university. In fact, they often leave the area for holidays, internships, or study abroad programs. Accordingly, there is also a need for methods and systems to enable efficient communication between university affiliated individuals when they are off-campus and do not access central university web pages.

Accordingly, there is a continuing need for methods and systems to overcome or avoid the above problems and limitations and enable persons in a community information network to efficiently communicate with other persons affiliated with the network.

SUMMARY OF THE INVENTION

To overcome the problems recited above, and in accordance with the invention as embodied and broadly described herein, embodiments of the present invention include methods and systems for transmitting electronic announcements or messages to selected users based upon their associated attributes. In one embodiment, the invention comprises a message module and an interface module. The message module is configured to associate users with one or more attributes. The interface module is configured to generate a template deliverable to an administrator. This template includes one or more fields within which various announcement attributes and data can be defined. At least one of the fields is a target criteria selection field that can be filled with recipient attributes selected from a list of attributes stored in the message module. The interface module can generate the electronic announcement or message from the data entered by the administrator into the template and the message module can transmit the electronic announcement or message to one or more recipients that have the one or more attribute values selected in the targeting criteria selection field. The electronic announcement data fields can also include a method of delivery field, a priority field, a subject field, an expiration field, or the like.

Additionally, embodiments of the present invention can allow an administrator or other user to define when an electronic announcement or message delivered to recipients within the information system is to expire. Stated another way, when an expiration period is defined, recipients of electronic messages may be unable to delete the announcement or message until such a period has expired.

Each administrator or other user can be a recipient of an electronic announcement or message. Consequently, the term "recipient" refers to any individual that receives an electronic announcement or message from some user or member.

When an administrator, or some other user delegated by the administrator to create announcements, wishes to transmit an announcement or message, the method can include retrieving a user interface for such an individual. This user interface can prompt the individual to search for and select one or more attributes that are associated with individual recipients or groups of recipients. For instance, the individual can select all freshmen, sophomores, juniors, seniors, administration, alumni, or the like to receive certain communications. Additionally, the individual can select all members of an organization or organization's department, peers, or the like.

Following selecting one or more attributes, the individual can combine the selected attributes using Boolean operators to create a complex targeting criteria that defines which recipient or group of recipients are to receive the announcement.

The illustrative method can further enable the individual to create an electronic announcement or message. This can be achieved through a user interface with associated fields that can be filled by the individual. Upon creating the electronic announcement or message, embodiments of the present invention facilitate transmitting the electronic announcement or message to those recipients having the attribute or attributes selected by the individual.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both methods and systems for enabling efficient electronic communication between individuals affiliated with an organization, such as an information system. The present invention enables a user, such as an administrator or other user of the information system, to prepare and deliver electronic announcements to other users, i.e., recipients, without specifically identifying each recipient within a group of recipients that will receive the announcements. These electronic announcements are deliverable to one or more recipients based in part on descriptive attributes, such as academic attributes, that distinguish such users from other members of the information system.

These electronic announcements include various attributes that define specific characteristics of the announcement and associated functionality. The organization of these attributes is one example of a data structure in accordance with the teaching of the present invention. This data structure can be generated as an individual inputs data into one or more fields to define the one or more attributes.

In one embodiment of the present invention, such data structures include a target criteria attribute. This target criteria attribute defines the criteria to be searched by the information system to identify the particular recipient or group of recipients to receive the announcement. The criteria can include one or more attributes selected from those attributes stored within a recipient's account, such as a user account. For example, in one configuration, the criteria are academic attributes specific to one or more users or individual of the information system. In another embodiment, the criteria can be specific to an organization, such as all vice presidents, presidents, managers, peer groups, sales representatives, division or organization members, departments, or the like.

The target criteria attribute can include one or more values that can be combined using operators to form the target criteria attribute. In this manner, an individual can define criteria that define the particular recipient or group of recipients to receive the announcement without specifically identifying account information, individual recipient names or electronic mail addresses for each recipient individually.

In one embodiment of the present invention, such data structures include a termination attribute. This termination attribute defines a termination event that results in the announcement being automatically deleted by the information system, enables a recipient to manually delete the announcement, enables a recipient to move the electronic announcement from being displayed persistently upon the recipient's personalized web page to storage, or the like. This termination event can be an expiration period or date that restricts a recipient's access to move or delete the announcement before the expiration of such a period. In this manner, the electronic announcement remains persistently upon a recipient's personalized web page as a reminder to perform certain actions, such as complete a project, file a report, take a test, or the like.

Although reference is made to the above variations of the termination event, one skilled in the art can identify various other termination events that can be defined by the termination attribute. For example, the termination event can be defined or modified while the announcement is displayed to the user of the information system, such as when a signal is received or generated by the information system indicating when the announcement is to be deleted, removed, moved, etc. In another configuration, the viewer of the announcement can delete the announcement when an administrator or the creator of the announcement grants such rights.

In addition to the above, embodiments of the present invention facilitate designating attributes that define the delivery method or manner used to distribute the electronic announcement, such as to a recipient's personalized web page acting as an interface to the information system. Other attributes include a designation as to the priority of the electronic announcement, other recipient's of the electronic announcement, the manner by which the electronic announcement is to be delivered to the recipients, and other attributes as defined and understood by those skilled in the art in light of the teachings contained herein. Further, the electronic announcement can be displayed to a user or recipient, whether on the personalized web page, or upon some other device or system designated by the author of the announcement, as will be discussed hereinafter.

The embodiments of the present invention can comprise a special purpose or general-purpose computer including various computer hardware, as discussed herein. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
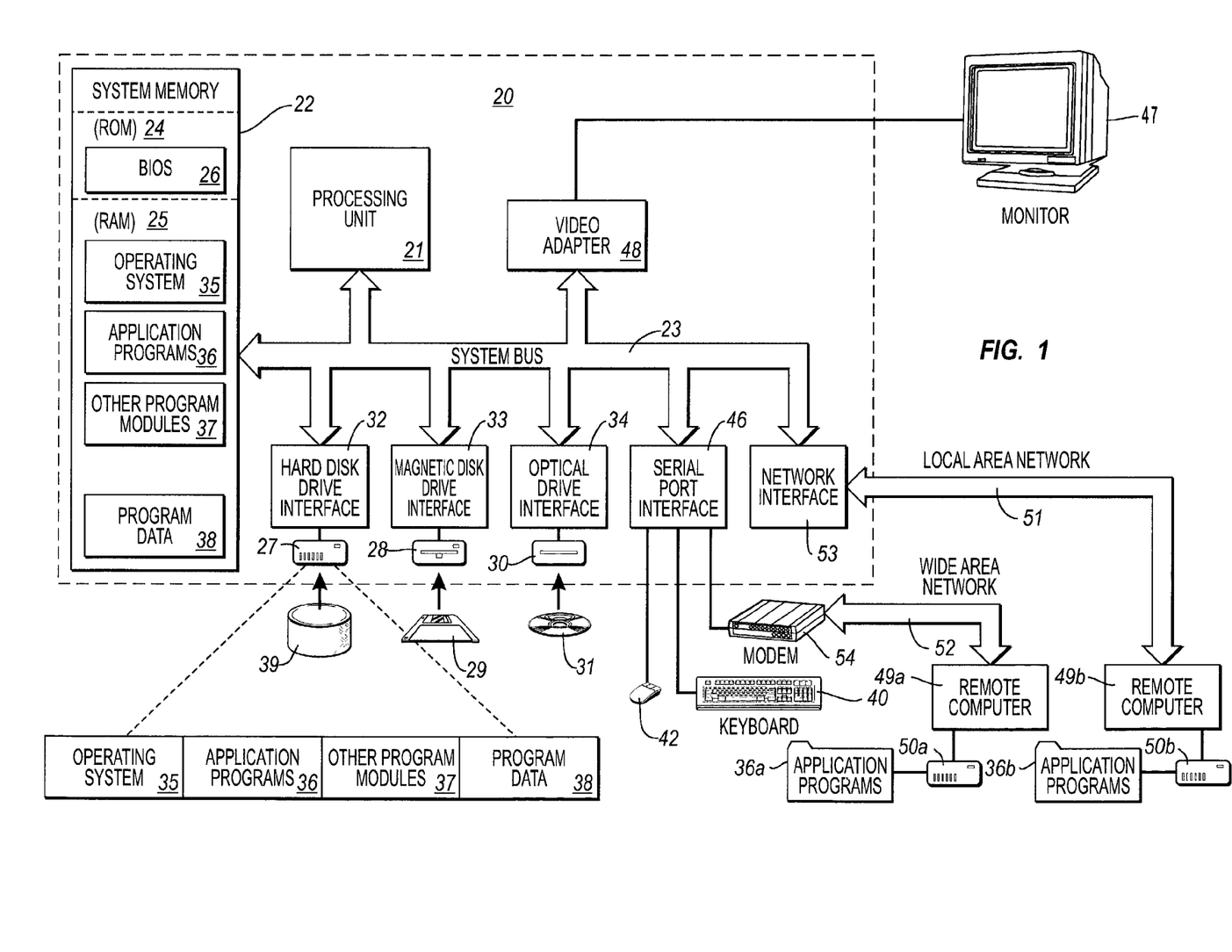
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc., that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules, and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port, or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets, and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over a wide area network 52 may be used.

Figure 2:
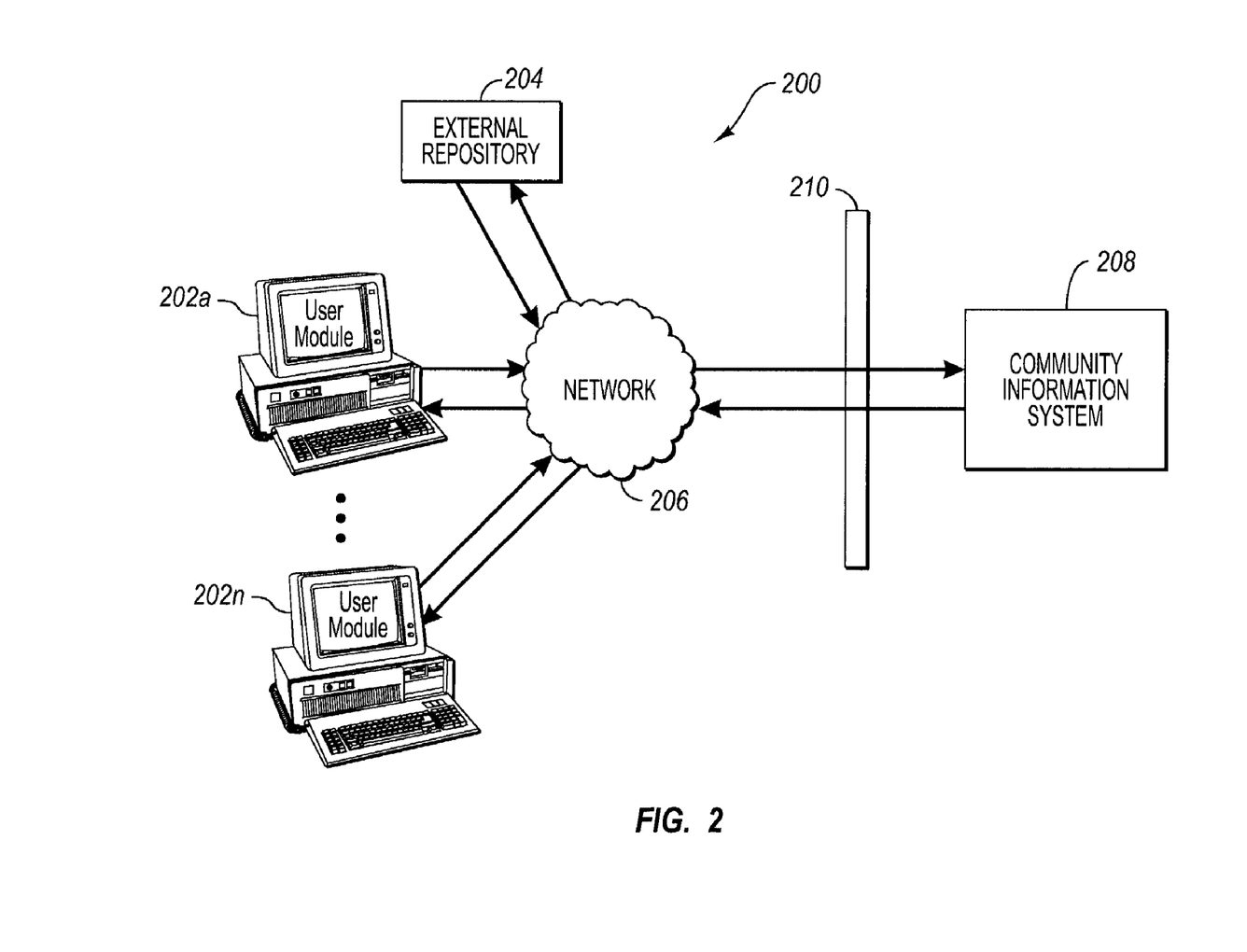
FIG. 2 is a schematic representation of one illustrative system of the present invention.

Referring now to FIG. 2, depicted is a schematic representation of one illustrative system utilizing the benefits of the present invention. As shown, the system, as designated by reference numeral 200, includes one or more user modules 202a–202n that communicate with an information system, designated as a community information system 208, through network 206. Optionally, an external repository 204 communicates with community information system 208 through network 206. Although reference is made to a community information system, the present invention can be embodied in any type of information system known to one skilled in the art.

The use of the term "communicate with" or the like terms as used herein is understood by one skilled in art to include any type of applicable connectivity or communication line connection between hardware and/or software modules and components of system 200. Such a connection or connectivity can include, but is not limited to, electromagnetic, optical, magnetic, electrical, physical or the like connection or connectivity.

Each user module 202a–202n can represent an individual or group of individuals that desire to access the resources and services associated with community information system 208 through one or more hardware and/or software modules. These one or more individuals can be one or more students, faculty members, administration staff, alumni of a university, employees of an organization or institution, combinations thereof, or the like. Alternatively, each user module 202a–202n can represent solely the hardware and/or software modules utilized by one or more individuals to access community information system 208. Consequently, each user module 202a–202n can represent a browser that facilitates communication with community information system 208 and access to the web-based applications and systems contained therein. In one configuration, the browser can be Microsoft® Internet Explorer, Netscape® Navigator or Communicator, or other browser applications known by one skilled in the art.

Besides user modules 202a–202n, community information system 208 can communicate with external repository 204. Although only a single external repository 204 is depicted, one skilled in the art can appreciate that system 200 can include multiple external repositories. External repository 204 acts as a data or information store accessible to community information system 208 and/or user modules 202a–202n. The information and data stored within external repository 204 can be related or unrelated to the operation of an organization or institution.

The external repository 204 can store different types of data and information within a database, whether hierarchical, relational, flat, or other database structure, including related database management systems (not shown). Such database can include, programmable ROM, CD-ROM, EEPROM, PCMCIA cards, compact flash cards, flash bios, dynamic memory, magnetic storage disks, optical storage medias, other modular or fixed memory, or the like for storing the information and data. External repository 204 can also include on-line web-based services at various web sites, such as, for example, Infospace® or other web sites offering user services such as news and information, retail purchasing, etc.

Facilitating communication between user modules 202a–202n, external repository 204, and community information system 208 is network 206. Network 206 can have many configurations, such as but not limited to a local area network (LAN) or a wide area network (WAN), no matter the particular type of topology, protocol, or architecture used to form network 206, so long as network 206 allows data transmission between user modules 202a–202n, external repository 204, and community information system 208.

To prevent unwanted access to community information system 208, system 200 can optionally include a firewall 210. Firewall 210 can use various techniques to protect community information system 208 and the various other modules and components on the community information system side of system 200 from unwanted access by individuals not meeting the designated security criteria or having the correct credentials. For instance, and not by limitation, firewall 210 can use a packet filter technique, an application gateway, a circuit-level gateway, a proxy server, other hardware and/or software modules and components, combinations thereof, or the like to prevent or control unwanted access to community information system 208.

In one setting, community information system 208 provides services and information to students, faculty, administration, and/or alumni of a university. In other settings, the present invention can be used with any organization or institution that includes one or more individuals that can receive electronic announcements and would benefit from: (i) a system that can identify a recipient or group of recipients of an announcement or message based upon targeted criteria without specifying each recipient individually; and/or (ii) receiving electronic announcements that are persistently displayed to each recipient of the announcement or message for a defined period of time or until the occurrence of a termination event.

Figure 3:
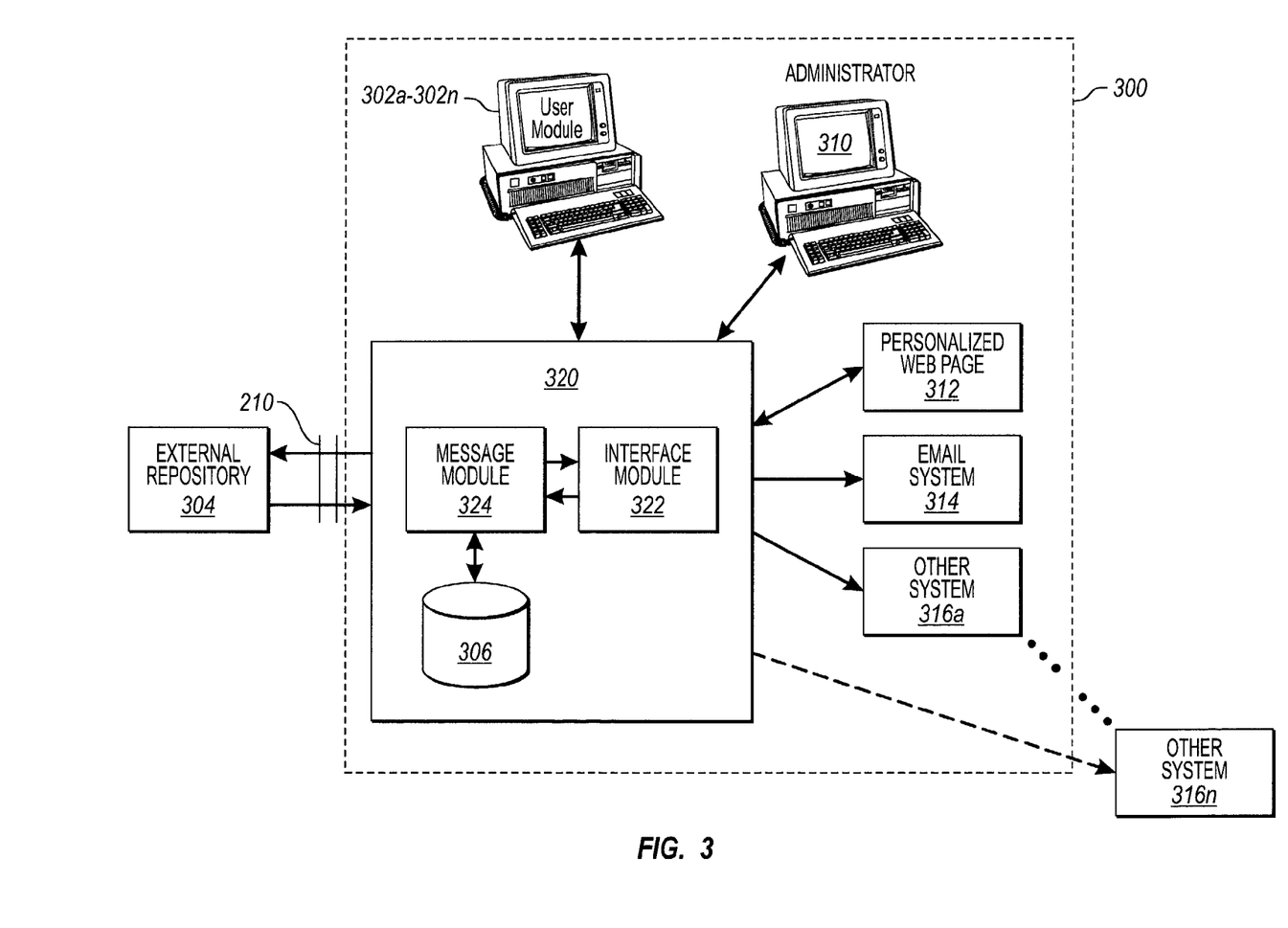
FIG. 3 is a more detailed schematic representation of an illustrative system of the present invention.

Referring now to FIG. 3, community information system 300, which can be the same or different from community information system 208, includes an integration module 320. Integration module 320, as the name implies, controls access to and communication between the modules and systems of system 300. In one configuration, integration module 320 acts as the hub of community information system 300, optionally with all communication between user modules 302a–302n and the external systems of community information system 300 passing through integration module 320. As illustrated, user modules 302a–302n can communicate with integration module 320 either directly from within community information system 300 or through firewall 210. Community information system 300 and user modules 302a–302n can have a similar or different configuration from community information system 208 and user modules 202a–202n, respectively, of FIG. 2.

Integration module 320, in this illustrative configuration, can take the form of one or more servers, computers, or the like that are capable of receiving data, and optionally manipulating the same and delivering data to other hardware and/or software modules. For example, integration module 320 can be computer 20 and receive data from an external system; incorporate the same within a personalized web page of a user of community information system 300; and deliver the data to user module 302a–302n.

Additionally, integration module 320 can include a plurality of user accounts, one or more for each user associated with community information system 300 and the products and services associated therewith. Stored within each user account is the data or information specific to the particular user. For instance, each user account can store credentials to enable the user to access other external systems and data for personalizing the recipient's personalized web page. Further, each user account can store announcements generated by an administrator or other user of community information system 300 that are to be persistently displayed to the user upon the recipient's personalized web page. These announcements can contain text, graphics, attachments, or the like.

Each user account can further store other information about the particular user. For example, and not by way of limitation, each user account can contain information about the user's gender, class status, e.g., sophomore, junior, senior, etc., grade point average, full time, part-time, continuing education, teaching assistant, full name, email address, list of courses currently attending, roles, group memberships, extracurricular group or organization membership, courses taught, academic major and minor, date of birth, year in school, school address, home address, date of last login, or the like.

The external systems of community information system 300 can include a student information system storing information and data about each student, faculty or administrative member, or alumnus, one or more existing legacy systems, third-party systems accessible via community information system 300 that provide additional functionality or services, future systems, or the like. Each of these external systems can be connected to an intranet that is controlled by integration module 320.

Although reference is made to use of an intranet, it can be understood that each external system and integration module 320 can be part of some other network associated with community information system 300. For instance, community information system 300 can utilize different types of network discussed herein with respect to network 106, whether or not such network is considered as an intranet, to connect the external systems and integration module 320. Further, the above is only one illustrative configuration of one embodiment of the present invention and one skilled in the art can appreciate that each of the external systems of system 200 can communicate one with another, without communicating through integration module 320.

In addition to the above, integration module 320 facilitates the delivery of announcements to users and/or administrators, collectively recipients, based on one or more attributes. As used herein, the term "user" encompasses all individuals utilizing user modules 302a–302n and/or user 202a–202n (FIG. 2), one or more automated computers performing the functions described herein, and combinations thereof, whether or not the same perform administrative functions. Additionally, as used herein the term "administrator" designates any specific user, whether an individual utilizing user module 302a–302n and/or user 202a–202n (FIG. 2), an automated computer performing administrative functions described herein, combinations thereof, or the like, that generates the electronic announcement according to the teachings herein. The administrator can be either a user located outside of community information system 300 or a user located within community information system 208. Thus, as used herein, the term "administrator" denotes a specific user that creates or authors an announcement according to the teachings of the present invention. For example, the administrator may be a professor, housing coordinator, student body officer, or the like.

The integration module 320, in one illustrative embodiment, includes an interface module 322, a message module 324, and a database 306. The interface module 322 generates a graphical user interface that can be used to access the resources and/or services of community information system 300. This graphical user interface can be customized for each individual using user module 302a–302n, such as with individual specific information, i.e., name, email messages, class schedules, or the like.

This customization is achieved at what is termed the "role" level and at the user level. In other words, each recipient's personalized web page includes customization based on the recipient's "role" in the system and the personal preferences of that user. These "roles" can include but are not limited to, students, alumni, faculty, system administrators, employee, officer, director, department, division, or the like.

At the user level, customization can be based upon the user's selection of various features, or can be based upon academic specific attributes or other characteristics of the user or recipient. Other such academic specific attributes can include, but are not limited to, those discussed with respect to the user accounts. For instance, extracurricular group or organization, gender, grade point average, full time or part-time, continuing education, teaching assistant, full names, email address, list of courses currently attending, roles, group memberships, courses taught, academic major and minor, date of birth, year in school, school address, home address, data of last login, or the like.

In one embodiment, interface module 322 enables an administrator 310 to communicate with integration module 320 to generate an announcement to be delivered to a specific recipient or group of recipients. In addition to simply providing a graphical user interface to the administrator, interface module 322 can facilitate the collection of data used to generate the announcements to be delivered to one or more personalized web pages 312, email systems 314, or other systems 316a–316n, such as an instant message system, by message module 324. Consequently, the administrator can define values for a variety of different attributes and fields that define the text of the announcement, the manner by which the announcement is delivered, the priority of the announcement, the targeting criteria defining the recipient or group of recipients to receive the announcement, the manner by which the announcement is deleted or removed from the personalized web pages, or the like. Further, the administrator can control the manner by which the announcement is archived by the information system. Alternatively, the user or another system can control announcement archival.

Figure 4:
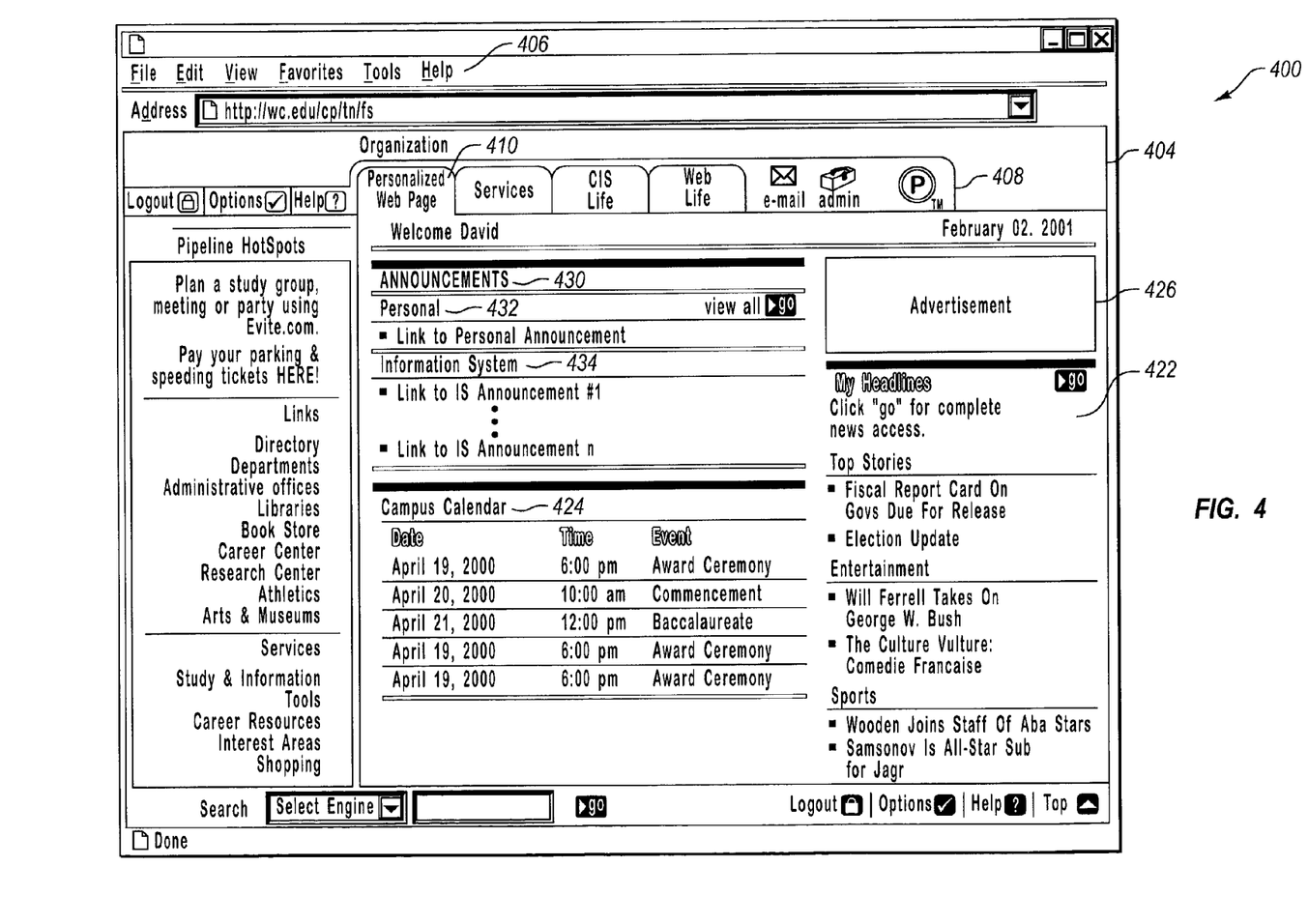
FIG. 4 is an illustrative depiction of a graphical user interface associated with a recipient's personalized home page according to one embodiment of the invention.

As shown in FIG. 4, the graphical user interface 400 can be displayed as a web page 404 accessible and displayable by a conventional browser. The interface 400 includes browser toolbar 406 that provides various typical "tools" and functions to an individual utilizing community information system 300. For example, browser toolbar 406 can provide the functions and tools provided by Microsoft® Internet Explorer, Netscape® Navigator or Communicator, or other browser applications known by one skilled in the art.

Graphical user interface 400 further includes a header 408 defining the different accessible portions of community information system 300. This header 408 acts as an interface to various other web pages associated within the community information system. As depicted, header 408 uses a "tab" type interface where selecting a tab enables a user to navigate from web page to web page for the selected information.

Although this is one embodiment, header 408 can use various other navigating methods as known to those skilled in the art. For example, header 408 can use drop-down menus, hypertext links, area maps, cards, JavaScript hierarchical menus, or the like.

As shown in FIG. 4, graphical user interface 400 includes a personalized web page 410. This web page provides news about the community information system, as contained within a news section 422, and calendared events for the community information system, as contained within calendar section 424. The appearance of this personalized web page can be modified either by a user or by the personnel affiliated with community information system 300 by removing or adding various sections, such as advertisement section 426, or by altering the appearance or arrangement of sections, such as community information system header 408.

Interface 400 also includes a section, termed an announcements section 430, which presents announcements or messages received from an administrator or other user, such as those announcements that remain viewable to the user until the occurrence of a termination event. Accordingly, depicted within announcement section 430 are a personal message section 432 and a message section 434. The personal message section 432 includes announcements that are specific to the recipient delivered from an administrator or other user of the community information system. For example, in the event that a professor wishes to deliver an announcement about grades, class projects, or the like to the students within his class, such an announcement can appear in personal message section 432. The entire text of the announcement can appear in the personal message section 432 and remain there until the occurrence of a termination event, i.e., passing of an expiration period, or the like.

It can be appreciated by one skilled in the art that the announcement can be displayed to the recipient by a variety of different manners. For example, in another configuration, the subject line is listed in personal message section 432. To access the entire text of the announcement, a recipient can select the announcement, i.e., clicking on the announcement, thereby resulting in personalized web page 410 changing to present the entire text of the announcement, with attachments as included, to the individual. In other embodiments, instead of changing personalized web page 410 a "pop-up" window can appear which contains the announcement when the displayed subject line is selected. In still another configuration, only a portion of the personalized web page 410 changes to display the announcement. In still another configuration, the notification of announcement displays the deliverer of the announcement and not the subject line of the announcement. In another configuration, the deliverer and the subject line are displayed to the recipient.

No matter whether the announcement is a personal or organization wide announcement, those announcements contained or accessible through personal message section 432 and/or message section 434 can remain persistently upon personalized web page 410 until the occurrence of a termination event. A termination event can include, but is not limited to, ending of an expiration period, passing of an expiration date, ending of an event listed in the announcement, completion of a project or assignment, the user marking the announcement as having been read, retraction of the announcement by the administrator, change in the user attribute such that the announcement is no longer applicable to the user, the user deleting the announcement, or the like.

Referring again to FIG. 3, integration module 320 can communicate with email system 314 that facilitates delivery of electronic mail messages ("email") to the members of community information system 300. Email system 314 can act as an email system that provides the functionality of sending, delivering, storing, and manipulating email messages between recipients and deliverers inside or outside of community information system 300. For example, such email systems can utilize Post Office Protocols (POP), Internet Message Access Protocol (IMAP), Simple Mail Transfer Protocol (SMTP), or the like. Further, such email systems can include the functionality provided by typical email software applications, such as but not limited to Microsoft® Outlook, Novell® GroupWise, Netscape® Messenger, or the like.

The email system 314 can be used to send reminders or duplicate copies of the announcements that are displayed upon personalized web page 410 (FIG. 4). In this manner, each recipient can receive multiple copies of the same announcements.

As illustrated, integration module 320 can communicate with one or more other systems 316a–316n that are included within or remote from community information system 300. In this manner, embodiments of the present invention are able to communicate with external systems through use of different messaging systems.

In communication with interface module 322 is message module 324. The message module 324 is configured to receive data and information from interface module 322 to enable an administrator or other delegated user to create an announcement to be displayed persistently to a recipient or group of recipients upon the associated personalized web page(s), as will be described with respect of FIG. 6. Alternatively, the announcement can be created through the graphical interface associated with interface module 322 and such announcement transmitted to message module 324 for retransmission to personalized web page 410 (FIG. 4).

These announcements can include various attributes that define particular functions and characteristics of the announcement. In one embodiment, the announcement includes a target criteria attribute that defines which recipient or groups of recipients are to receive the announcement. An individual through a graphical user interface creates this target criteria attribute from selectable target criteria. These target criteria can be one or more attributes selected from those contained or included in the user or recipient's account. For example, and not by way of limitation, gender, class status, e.g., sophomore, junior, senior, etc., grade point average, full time, part-time, continuing education, teaching assistant, full names, email address, list of courses currently attending, roles, group memberships, extracurricular group or organization membership, courses taught, academic major and minor, date of birth, year in school, school address, home address, date of last login, or the like. Additionally, when the present invention is utilized in a non-university setting, the target criteria can include any criteria that define one or more recipients to receive an announcement. For instance, and not by way of limitation, gender, years with organization, position within organization, department, job description, date of birth, home address, vacation status, or the like.

Operators can be used to combine the defined criteria to form the target criteria attribute. These operators can include, but are not limited to, Boolean operators, arithmetic operators, and the like. This target criteria attribute is subsequently used by message module 324 and/or other elements of the community information system to dynamically identify the particular recipient(s) that match the criteria. For instance, when the Boolean operator between each criteria is an AND operator, one criteria defined within the target criteria attribute is compared against a database of recipient attributes to define a first group of matched recipients. A second criterion is searched in this first group of matched recipients to create a second matched group. This process continues until the $n^{th}$ criterion is searched and an $n^{th}$ matched group is defined. This $n^{th}$ matched group contains the list of those recipients to receive the announcement.

One skilled in the art can identify other processes for other Boolean operators, such as but not limited to AND, OR, NOT, or the like. For instance, message module 324 can retrieve attributes of each user from database 306 and compare these attributes against the target criteria attribute defined within the announcement to identify which recipients are to receive the announcement. A message recipient is identified when a match occurs between the announcement target criteria attribute and the attributes of a user. Additionally, one skilled in the art can identify processes for different types of operators, such as but not limited to, arithmetic operators.

Message module 324 can obtain the criteria or attributes of potential recipients via a variety of different manners. For instance, in one embodiment, message module 324 can access the registry of potential recipients or such information that can be used to generate a registry from any of the various sources identified above, i.e. student information system, legacy system, or the like. Further, message module 324 can access information regarding user attributes from external repository 304 across firewall 210. The external repository 304 can contain information regarding potential recipients of the announcements. For example, a university club may have a web page that identifies club members located on a third party system that is outside community information system 300. The message module 324 can access the web page, obtain the data regarding club membership, and affiliate potential recipients with the university club.

The announcement of the present invention can include an attribute that designates the period of time that the announcement will remain persistently upon the recipient's personalized web page, i.e., the termination attribute. Further, each announcement can include attributes that defines: (i) the manner by which the announcement is to be delivered to the recipient, i.e., a delivery attribute defining whether the announcement is delivered by email, pages, voice messaging, the personalized web page, combinations thereof, or the like; (ii) the subject of the announcement, i.e., the subject attribute; (iii) the priority of the announcement, i.e., a priority attribute; (iv) the underlying text of the announcement, i.e., the message attribute, (v) the creator of the announcement, i.e., an author attribute, and (vi) the status of the attribute as to whether the announcement was delivered, undeliverable, etc., i.e., a status attribute.

As mentioned above, each announcement can have associated therewith various attributes that defines the manner by which recipients are selected, the manner by which the announcement is delivered, displayed, and removed from a recipient's personalized web page, or the like. One such attribute is a priority attribute that defines the level of priority of the announcement. Thus, an emergency announcement delivered to a personalized web page can have a high priority, resulting in integration module 320 displaying the personalized web page with the announcement being highlighted or otherwise identified as being high priority. For instance, the identifier of the announcement contained in personal message section 432 or message section 434 can flash, have a different color, include flags or other markers identifying the high level of priority, combinations thereof, or the like.

In another configuration of the present invention, the priority attribute includes a priority identifier that is understandable or can be identified by email system 314 or other system 316a–316n. Consequently, when email system 314 and/or other system 316a–316n, or any associated client or service device, receives the announcement, such systems 314, 316a–316n or devices can display the announcement to the user with the selected priority. For example, the announcement can include a high priority attribute that is understood by a system or device that receives the announcement resulting in the system or device, when applicable, marking or identifying the announcement with the appropriate priority identifier. Additionally, a high priority announcement delivered to a personalized web page may be immediately displayed to the recipient.

Another attribute that can be associated to the announcements is the termination attribute. For, example, the message can include an expiration date, a period of time after which the message is deleted, i.e. one week, a data field that indicates an event, which when it occurs, triggers the deletion of the message. For example, a professor may select to delete a message regarding a homework assignment upon receipt of the homework assignment. Various other termination attributes are known to those skilled in the art, such as but not limited to those described herein.

Yet another attribute that can be attached to the announcements is a tracking attribute that defines a method of tracking user awareness of the transmitted message. The attribute defines whether a notifying message is to be sent to the administrator indicating when the recipient has accessed the message. The feature could include additional information, such as how many times the recipient accessed the message, and for how long.

Still other attributes associated with the announcement can include a status attribute that defines whether the announcement was delivered to the recipient or group of recipients or whether the announcement was undeliverable. Further, the announcement can include an author attribute that identifies who created the announcement. Such attributes can be displayed to the recipient or the author of the announcement upon respective personalized web pages.

Another message attribute can be a "time of delivery" attribute. This would be used to provide a delayed delivery capability for the announcement. Consequently, the announcement could be delivered at a time sometime after the announcement is initially created and/or submitted to message module 324. One illustrative example would be an announcement of a sale at the Campus Bookstore. The announcement of the sale could be created on one date but delivery to the recipient or group of recipients could be delayed until the date on which the sale actually started, a few days before, or the like.

In addition to interface module 322 and message module 324, integration module 320 can include a database 306 filled with user and other potential recipient lists and associated attributes, such as those discussed with respect to the user account. The database 306 can be populated with the information by importing or synchronizing such information from other systems, applications, and platforms, such as the external systems. For example, (LDAP) server to store all user, user attributes, and access information within its system. LDAP is a widely accepted, open, cross-platform software protocol enabling standardized access to individuals, groups, and other resource on a network from an organization's intranet or via the Internet.

Figure 5:
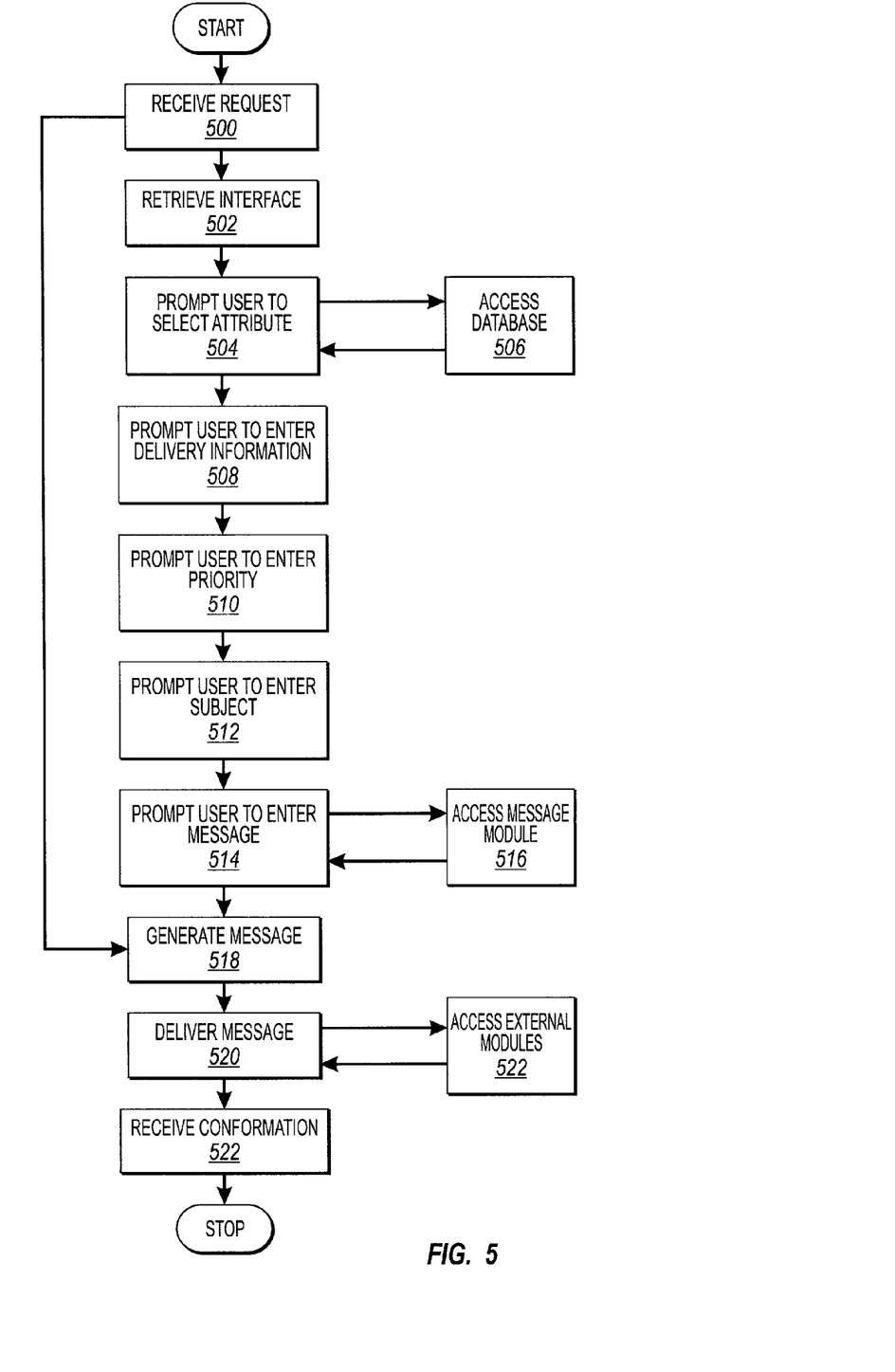
FIG. 5 is a flow diagram representing the flow of data through the system illustrated in FIGS. 2 and 3.
Figure 6:
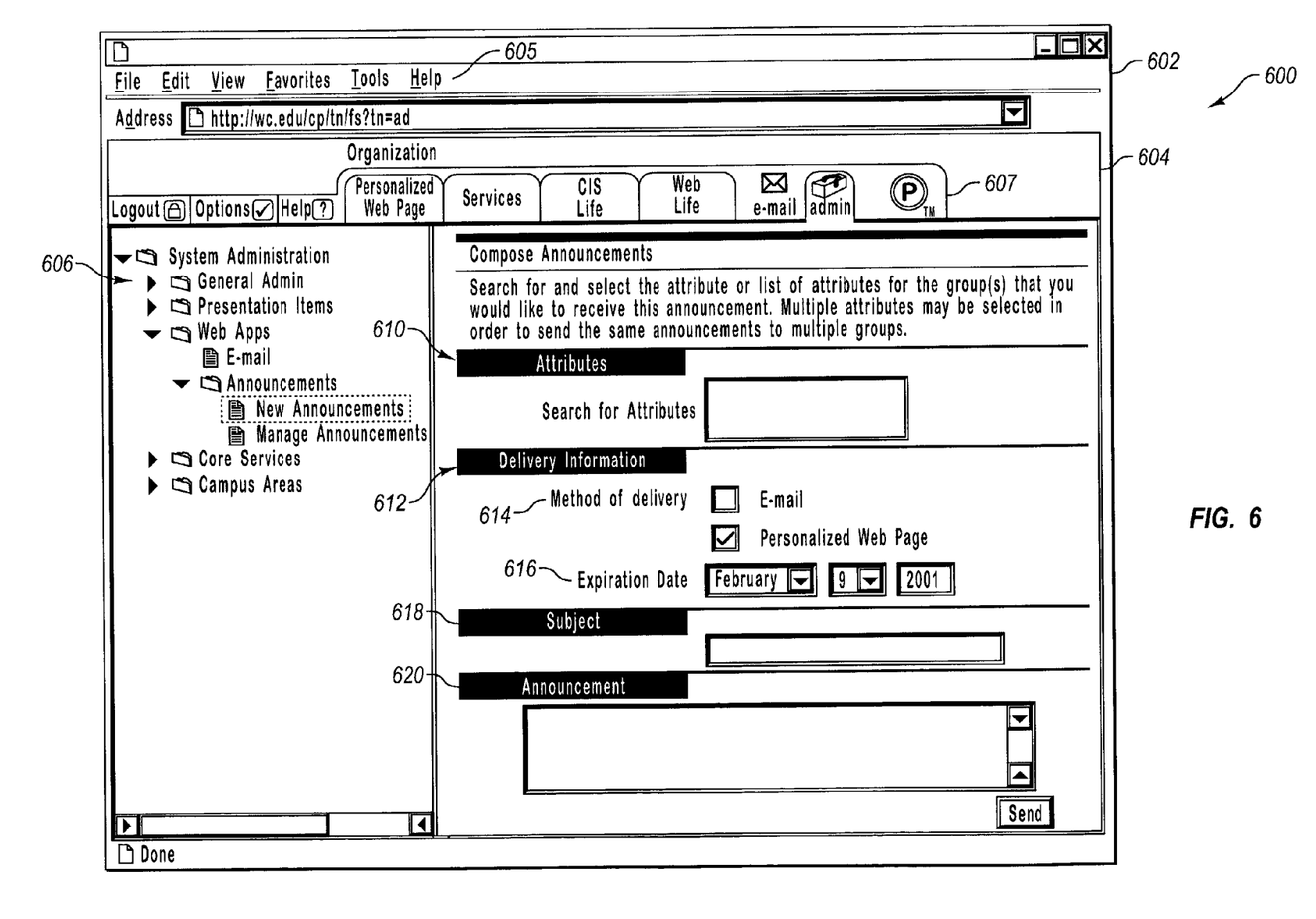
FIG. 6 is an illustrative depiction of a graphical user interface according to another embodiment of the invention.

Referring now to FIG. 5, a flow diagram describing an illustrative operation of the present invention is presented. In one embodiment, interface module 322 receives a request to create an announcement from an administrator 310 or user utilizing 302a–302n and/or user module 202a–202n, as represented by block 500. The interface module 322, whether alone or in combination with message module 324, retrieves a graphical user interface for the individual, as illustrated in FIG. 6 and as represented by block 502. This interface can be used to collect message or announcement data that defines the target criteria, text, the delivery manner, the priority, the subject, and the termination events for the announcement.

Included in the graphical user interface are a variety of fields, which may be filled by the individual that wishes to create the announcement. These fields can be configured to receive data or rules associated with the target criteria attribute, termination attribute, delivery attribute, priority attribute, subject attribute, and message attribute. Interface module 322 and/or message module 324 can prompt the individual for information in any order. Although the prompts are described in a particular order hereinbelow, it will be appreciated that the order can be modified within the scope of the present invention. Further, although reference is made to functions performed by interface module 322, one skilled in the art can appreciate that message module 324 can perform the same function either alone or in combination with interface module 322 or other modules of the present invention. Similarly, although reference is made to actions made by the administrator, other users can perform similar functions as delegated by an administrator. For instance, the administrator can give rights to other users or individuals to create and deliver announcements.

In one embodiment, this can be achieved as an administrator activates an access attribute stored within the user account of the user. By so doing, the administrator grants or denies access to the resources or services of message module 324 and hence the ability to create and deliver announcements. Other manners or methods of granting or denying access to the announcement functionality are known to those skilled in the art. For example, access can be granted when an individual is member of a group which has been delegated the capability to send announcements.

Initially, interface module 322 prompts administrator 310 to select one or more attributes that define the one or more recipients to receive the announcement, as represented by block 504. For example, the administrator can select and define the target criteria attribute, the termination attribute, the delivery attribute, the priority attribute, the subject attribute, message attribute, or other attributes described herein or identifiable by one skilled in the art in light of the teaching contained herein. By so doing, administrator 310 can identify individual or groups of recipients to receive the announcement without enumerating each specific recipient.

It will be appreciated that numerous manners can be employed to select the attributes. For example, one preferred method is a simple keyword search. After administrator 310 enters the keyword(s), user interface module 322 accesses message module 324 to search database 306 for occurrences of the keyword, as represented by block 506. The message module 324 can then either return a list of potential matches to administrator 310 to enable administrator 310 to select the preferred attributes or refine the search, or can return the potential attributes as the desired results.

Another attribute selection method utilizes a directory/sub-directory tree, whereby administrator 310 browses through a series of directories and sub-directories, such as majors and courses, to select the desired attributes. These can be contained in a drop-down menu, a scrollable list of attributes, a checkable list where each attribute has an associated checkbox, a highlightable list, combinations thereof, or the like. The above-recited selection methods are examples of means for selecting one or more attributes. One skilled in the art can identify various other methods or means for selecting the one or more attributes. For instance, LDAP queries, SQL queries, graphical user interface based query builder, or the like.

When the attributes are selected, such as the target criteria attribute, interface module 322 optionally can enable administrator 310 to view the particular recipients that are associated with the given attributes. Depending upon the criteria used to identify the recipients, the number of recipients to receive the announcement can be large. Consequently, an individual is able to select whether he/she is to view the recipients that are to receive the announcement.

The administrator 310 or author can select one or more attributes or criteria for the target criteria attribute and connect the same using one or more of a variety of operator. These operators can include, but are not limited to, Boolean operators, arithmetic operators, or the like.

Next interface module 322 prompts administrator 310 to enter the delivery information with a delivery field, as represented by block 508. The delivery field can include such attributes or selections as the method of delivery, i.e. personalized web page, email or other message system, the priority that the message should receive, combinations thereof, or the like. Other information can also be entered at this time, such as whether administrator 310 desires to be notified when the message has been read, i.e., received a notifying message. Other attributes that can be defined for each announcement include an expiration date for the message and the specification of termination attribute; these being listed within the termination event field.

As illustrated, user interface module 322 can prompt administrator 310 to define the priority level for the announcement within the priority field, as represented by block 510. This priority level can vary based upon the type of announcement sent and the particular urgency associated with the message. Depending upon the priority designated, the announcement can be displayed to the recipient in a variety of different formats associated with the priority designation. For instance, high priority announcements may be colored differently from the low priority announcements, high priority announcement may be larger font than low priority announcements, or the like. Various other manners of distinguishing between high priority and other priority announcements may be known to those skilled in the art.

In one configuration, user interface module 322 then prompts administrator 310 for a subject line that describes the announcement, as represented by block 512. The subject line, which is contained within a subject field, can serve as the announcement identifier when the recipients are notified of the incoming announcement. It can be understood that each announcement does not need a subject line, and consequently each announcement can be devoid of data within the subject line field.

User interface module 322 next prompts administrator 310 to enter the announcement, as represented by block 514. Typically, administrator 310 is prompted to type an original announcement into a field on the graphical user interface. However, user interface module 322 can also enable administrator 310 to select from among a database of announcements that are stored by database 306, external repository 304, or some other internal or external database or repository. This is accomplished by accessing message module 324, as represented by block 516, which coordinates announcement retrieval or access to database 306 and retrieval of a list of announcements that are subsequently displayed to administrator 310 for his/her selection. Further, when embodiments of the present invention enable an individual to include an attachment with the announcement, the individual can select a particular document, file, directory, or the like through the graphical user interface to be sent with the announcement.

According to one aspect of the present invention, message module 324 retrieves the pre-composed announcements and stores them in database 306 before they are requested by administrator 310, thus enabling quick access. Alternatively, identifying titles for each announcement are stored within database 306 and linked to another external repository containing the text of the pre-composed messages.

Once all message attributes are gathered by interface module 322, a message is generated, as represented by block 518, and it is handed off to the message module 324 and delivered to the selected recipients that are affiliated with the selected attributes, as represented by block 520. As discussed previously, the messages can be delivered to the recipient's personalized web page, email systems, or other external systems, such as external databases, messaging systems, or the like, as represented by block 522.

Finally, a confirmation is delivered to the administrator indicating which announcements have been delivered and which are undeliverable, as indicated by block 524, i.e., the delivery of the notifying message.

According to another embodiment of the present invention, and illustrated in FIG. 5, integration module 320 (FIG. 3) can receive a request from an external system 316a–316n to deliver an announcement to a list of recipients defined by external system 316a–316n. Illustratively, a student information system can request delivery of an announcement to a number of recipients. This announcement can include one or more attributes as described herein. In such a case, the present invention need not display the graphical user interface to the administrator, but circumvents collecting announcement attributes from the administrator. As illustrated, in such as case, the received announcement attributes, or request to delivery the same, from the external system 316a–316n is delivered to message module 324 that prepares the announcement and subsequently delivers the same to the recipients, as represented by the arrow that extends from block 500 to block 518. Alternatively, the announcement can be prepared such that message module 324 merely delivers the announcement to the recipients, i.e., performs the functions described with respect to block 520.

Referring now to FIG. 6, depicted is an graphical user interface 600 according to the invention through which an administrator or some other individual can create announcements targeted to specific recipients or groups of recipients within community information system 208 (FIG. 2). Illustrated is a browser 602 with a graphical user interface 604 depicted in a window therein. Various toolbars and directories are illustrated, including browser toolbar 605, community information system header 607, and system administration directory 606.

Attribute section 610 illustrates a search field for locating attributes. Of course, the appearance of this field will vary depending on the search method utilized to select attributes, i.e. direct search or directory/sub-directory search. Delivery information section 612 illustrates that the method of delivery 614 can be selected by checking one or more of various boxes. For example, administrator 310 can designate message delivery by e-mail or to a personalized web page and can designate a message expiration date 616. Subject section 618 illustrates the field where a subject line can be entered. Finally, announcement section 620 illustrates a field for textually entering a message. Of course, the appearance of this field will correspond to one of various forms of search or directory fields if a pre-composed message is desired.

The present invention may be embodied in other specific forms without departing from its spirit or essential characteristics. For example, the functionality of two or more modules can be combined into a single module, while the functionality of individual modules can be separated into functions performed by multiple modules. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system comprising an information system and a graphical user interface associated with the information system, a method for selectively displaying at least one announcement upon the graphical user interface to a group of recipients selected from a plurality of recipients, the method comprising:

a step for creating an electronic announcement comprising a termination attribute, a message attribute, and a target criteria attribute;

a step for identifying a group of recipients from the plurality of recipients to receive the electronic announcement by comparing the target criteria attribute against one or more attributes associated with each of the plurality of recipients, the group of recipients comprising at least one recipient of the plurality of recipients having at least one of the one or more attributes matching the target criteria attribute;

a step for persistently displaying the electronic announcement to the at least one recipient accessing the information system subsequent to delivery of the electronic announcement; and a step for terminating the persistent display of the electronic announcement based upon the termination attribute defined by an author of the announcement.

2. The method as recited in claim 1, wherein the target criteria attribute comprises a plurality of attributes connected together using one or more operators.

3. The method as recited in claim 1, wherein the target criteria attribute comprises at least one of a recipient's gender, grade point average, full time or part-time status, continuing education enrollment, teaching assistant position, courses currently attending, role, group or organization membership, courses taught, academic major, academic minor, date of birth, year in school, school address, home address, or date of last login.

4. The method as recited in claim 1, wherein the target criteria attribute comprises at least one of a recipient's electronic mail address, first name, or last name.

5. The method as recited in claim 4, wherein the step for creating comprises presenting an individual with at least one directory of selectable criteria associated with the plurality of recipients.

6. The method as recited in claim 1, wherein the step for creating comprises defining a plurality of criteria and a plurality of operators combining the plurality of criteria.

7. The method as recited in claim 6, wherein each of the plurality of operators is a Boolean operator.

8. The method as recited in claim 1, wherein the step for identifying further comprises searching a message module for the least one attribute associated with the group of recipients, the message module accessing at least one database configured to store the at least one attribute.

9. The method as recited in claim 1, further comprising a step for identifying at least one priority attribute for the electronic announcement, the at least one priority attribute defining the manner by which the electronic announcement is displayed to the group of recipients.

10. The method as recited in claim 1, further comprising a step for selecting a pre-composed electronic announcement stored in the information system.

11. The method as recited in claim 1, further comprising a step for receiving a pre-composed electronic announcement from an external system.

12. The method as recited in claim 1, further comprising a step for identifying a delivery attribute for the electronic announcement, the delivery attribute defining one or more a methods for delivering the electronic announcement to the group of recipients.

13. The method as recited in claim 12, wherein the electronic announcement is delivered by electronic mail.

14. The method as recited in claim 12, wherein the graphical user interface is customized for the group of recipients.

15. The method as recited in claim 12, wherein the electronic announcement is delivered as an instant message to the graphical user interface.

16. The method as recited in claim 1, wherein the termination attribute defines a period of time between the time when the electronic announcement is displayed to the group of recipients and when the electronic announcement is automatically terminated from persistent display.

17. The method as recited in claim 1, wherein the termination attribute includes at least one rule that defines when to terminate persistently displaying the electronic announcement.

18. The method as recited in claim 1, wherein the termination attribute is modifiable by receipt of an electronic communication indicating the electronic announcement should be terminated.

19. The method as recited in claim 1, further comprising a step for transmitting to the individual a notifying message after a recipient of the group of recipients has read the notifying message, the notifying message indicating that the recipient accessed the message.

20. The method as recited in claim 19, wherein the notifying message indicates the number of times the recipient accessed the message.

21. The method as recited in claim 1, further comprising a step for archiving delivered electronic announcements.

22. The method as recited in claim 1, wherein the information system is a university system.

23. The method as recited in claim 1, wherein the duration of time that the electronic announcement is persistently displayed to the group of recipients is controlled by the author of the announcement.

24. In a system comprising at least one server, a method for transmitting an electronic announcement to at least one recipient selected based upon a target criteria attribute defined by the creator of the electronic announcement, the method comprising the acts of:
  requesting a graphical user interface configured to facilitate entry of electronic announcement data, the graphical user interface comprising at least fields for defining at least one of a termination attribute, a target criteria attribute, and a message attribute;
  defining at least one recipient of a plurality of recipients to receive the electronic announcement data based upon the announcement target criteria attribute and at least one attributed associated with the at least one recipient;
  at the at least one server, generating and storing an electronic announcement, derived from the electronic announcement data, for access by the at least one recipient upon the at least one recipient accessing the information system; and
  upon the at least one recipient accessing the information system, persistently displaying the electronic announcement to the at least one recipient upon a graphical user interface customized for the at least one recipient, display of the electronic announcement being terminated based upon the termination attribute.

25. The method as recited in claim 24, wherein the graphical user interface further comprises a delivery information field by which a delivery attribute is defined.

26. The method as recited in claim 24, wherein the graphical user interface further comprises a priority selection field by which a priority attribute is defined.

27. The method as recited in claim 24, wherein the graphical user interface further comprises a subject field by which a subject attribute is defined.

28. In a computer system having at least one graphical user interface, a method for creating an electronic announcement displayable upon a customizable web page of at least one selected recipients of a plurality of recipients based upon one or more recipient attributes, the method comprising the acts of:
  displaying a graphical user interface comprising a plurality of fields upon a first display, the plurality of fields capable of being filled with announcement data associated with an electronic announcement, the plurality of fields comprising at least one of:
    a text field containing the text of the electronic announcement;
    a subject field containing a description of the subject of the electronic announcement;
    a priority field representative of a priority level of the electronic announcement; and
    a termination event field which defines the one or more events that removes the electronic announcement from display to the one or more recipients;
  upon receiving the announcement data through the graphical user interface, generating the electronic announcement from the announcement data; and
  displaying the electronic announcement upon the personalized web page until the occurrence of the termination event defined in the termination event field.

29. The method as recited in claim 28, wherein the plurality of fields further comprises a method of delivery field.

30. A computer product for implementing in a networked computer, a method for enabling an individual to transmit messages to selected recipients based upon a target criteria attribute, the computer program product comprising:

a computer-readable medium carrying computer-executable instructions that, when executed at the computer, cause the computer to perform the method, the method including the acts of:

upon receiving a request from an individual to transmit a message, retrieving for and transmitting to the individual a user interface, the user interface comprising a plurality of selectable attributes associated with a plurality of recipients, at least one termination attribute defining a termination event, and a plurality of fields capable of being filled with message data;

upon the individual selecting one or more of the plurality of selectable attributes and filling one or more of the plurality of fields, creating an electronic announcement based upon the plurality of selectable attributes and the message data;

identifying at least one recipient of the plurality of recipients that has at least one attribute the same as at least one of the plurality of selectable attributes selected by the individual; and persistently displaying the electronic announcement to the at least one of the plurality of recipients until the occurrence of the termination event defined by the individual.

* * * * *

UNITED STATES PATENT AND TRADEMARK OFFICE
CERTIFICATE OF CORRECTION

| | | |
|---|---|---|
| PATENT NO. | : 7,133,901 B1 | |
| APPLICATION NO. | : 10/008342 | |
| DATED | : November 7, 2006 | |
| INVENTOR(S) | : Richard S. Dalby et al. | |

It is certified that error appears in the above-identified patent and that said Letters Patent is hereby corrected as shown below:

In Column 14, line 60, please replace "For example, (LDAP)" with --For example, embodiments of the present invention can use a Lightweight Directory Access Protocol (LDAP)--

Signed and Sealed this

Fifteenth Day of May, 2007

JON W. DUDAS
*Director of the United States Patent and Trademark Office*